April 4, 1961

C. L. J. BOUTET 2,977,651

ALUMINOTHERMAL WELDING OF RAILS AND LIKE BARS
HAVING SPECIAL CROSS-SECTIONAL SHAPES

Filed Feb. 26, 1958

INVENTOR
CAMILLE LOUIS JACQUES BOUTET

BY Toulmin & Toulmin
ATTORNEYS

United States Patent Office 2,977,651
Patented Apr. 4, 1961

2,977,651

ALUMINOTHERMAL WELDING OF RAILS AND LIKE BARS HAVING SPECIAL CROSS-SECTIONAL SHAPES

Camille Louis Jacques Boutet, 68 Rue Ordener, Paris, France

Filed Feb. 26, 1958, Ser. No. 717,631

Claims priority, application France Mar. 26, 1957

3 Claims. (Cl. 22—206)

The present invention relates to the aluminothermal welding of rails and like bars having a cross-section substantially symmetrical about a plane.

It is known that the necessary condition for obtaining a weld of excellent quality is that all operations of a thermal character (preheating the bar and mould, pouring of the metal) should be distributed in uniform manner relative to the plane of symmetry of the bar.

Now, up to the present time, it has not been possible to satisfy this condition.

According to a relatively old method, there is used, for effecting the aluminothermal welding of a rail, a mould arranged to permit, on the one hand, the lateral preheating of the web and/or the flange of the rail and, on the other hand, the symmetrical pouring of the welding metal on the head of the rail.

According to a more recent method, a mould is used which permits, on the one hand, the axial preheating directly on the head of the rail and, on the other hand, a lateral pouring of the weld metal.

Each of these two methods has its advantages and drawbacks. The first has the advantage of a symmetrical pouring but the drawback of an asymmetrical and therefore non-uniform preheating. The second method has the reverse advantage and drawback.

The present invention permits combining the advantages of these two known methods and radically eliminating their drawbacks.

According to the invention, the new method of aluminothermal welding of rails and other bars is characterized in that, on the one hand, the gaseous mixture for effecting at least partially the preheating is introduced in the welding mould through the upper part of the latter substantially in the plane of symmetry of the rails to be welded, so as to circulate downwardly along these rails, whereas, on the other hand, means are provided for constraining the weld metal, brought in after the preheating, to flow symmetrically on either side of the region of introduction of said gaseous mixture, that is, on either side of the plane of symmetry of the rails, this weld metal entering the welding region substantially at the level of the head of the rails.

A further object of the invention is to provide a mould for carrying out the aforementioned method, said mould being characterized in that, in addition to two lateral pipes leading from a pouring cup and terminating substantially at the level of the head of the rails to be welded, these pipes being provided to supply the welding metal and being disposed on either side of the plane of symmetry of the rails, said mould comprises an axial pipe which is disposed between said lateral pipes for introducing combustion gases effecting the preheating and is capable of being closed after said preheating to permit the symmetrical pouring of the welding metal solely through said lateral pipes.

Further features and advantages of the invention will be apparent from the ensuing description with reference to the accompanying drawing, to which the invention is in no way limited.

Figure 1:
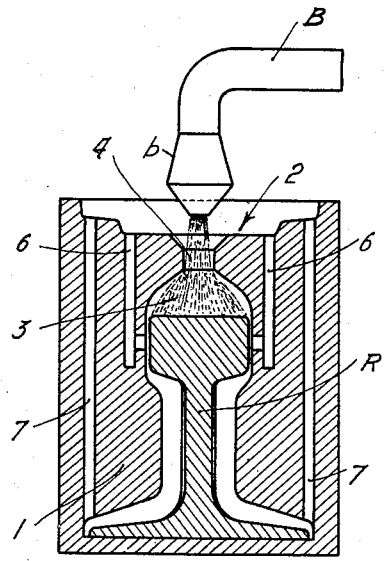
Fig. 1 is a cross-sectional view of the mould during preheating.
Figure 2:
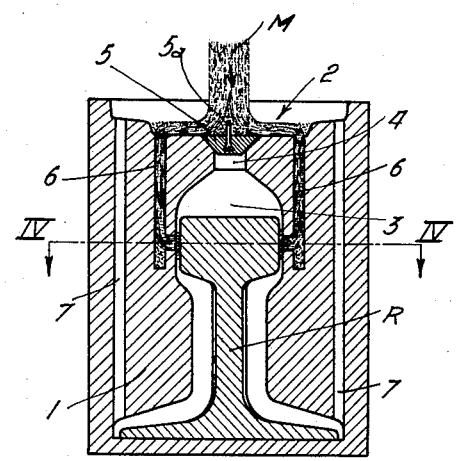
Fig. 2 is a view similar to Fig. 1 of the mould during pouring of the welding metal.
Figure 3:
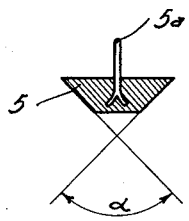
Fig. 3 is an axial sectional view of the closing plug for the preheating pipe.

In Figs. 1 and 2, the mould (composed, for example, of sand) is generally indicated by the reference numeral 1 and comprises, at its upper part, a central recess 2 from the bottom of which extend three vertical apertures communicating with a central chamber 3 in which the ends of the rails R to be welded are disposed. These three apertures comprise a central aperture 4, which is highly tapered and is capable of being closed by a refractory detachable plug 5, and two lateral apertures 6 symmetrically disposed relative to the central apertures 4 and communicating with the chamber 3 substantially at the level and on either side of the head of the rails.

Leading off from the lower part of the chamber 3, in the region where the edges of the flanges of the rails R are placed, are air vents 7 which communicate with the exterior at the upper part of the mould 1.

To effect the preheating, there is injected through the nozzle B the gaseous combustible mixture into the chamber 3 by way of the central aperture 4. The combustion develops in the upper part of the chamber 3 above and below the heads of the rails and travels along the webs and flanges of the rails, after which the gases of combustion escape through the air vents 7. The nozzle B has a very enlarged part $b$. Its outlet cross-section is less than its gas supply cross-section and the fuel mixture is therefore brought into the mould by a jet having a regular shape which is symmetrical relative to the joint line of the rail.

When the preheating is finished, which preheating is particularly advantageous, owing to the fact that maximum supply of heat is effected through the top of the mould, the central aperture 4 is closed by the refractory plug 5, advantageously provided with an iron rod $5a$ permitting it to be handled with tongs, and the welding metal M can then be poured directly into the recess 2, whence the metal passes through the lateral apertures 6 and enters the chamber 3 at the level of the head of the rails R.

As pouring proceeds, the molten metal rises in the vents 7.

The plug 5 is advantageously composed of a light material and has at its base an included angle $\alpha$ which is such that when the mould is full, the metal is capable of raising the plug. At this moment, the central aperture 4 performs the function of a vent permitting evacuation of the air which had accumulated in the upper part of the chamber 3 and "feeds" the weld.

Figure 4:
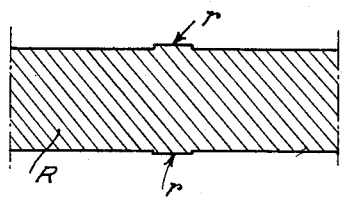
Fig. 4 is a horizontal sectional view taken substantially along line IV—IV of Fig. 2 of the head of the welded rails.

Owing in particular to this central vent, the bosses which have to be provided in certain known methods on both sides of the head and have to be removed hot, can now be reduced to mere thickening $r$ of about a millimeter (Fig. 4) which can be ground off.

Although a specific embodiment of the invention has been described, many modifications and changes may be made therein without departing from the scope of the invention as defined in the appended claims.

What I claim is:

1. Mould for the aluminothermal welding of shaped bars of the class of rails and having a cross-section substantially symmetric about a plane, said mould, which is to be located in the welding zone, comprising: a central cavity for receiving the ends of the bars to be welded; a pouring cup located at the upper part of the mould above said cavity; two lateral pipes located symmetrically about the plane of symmetry leading from said cup and terminating in said cavity substantially at the level of the upper part of said bars; an axial pipe located between said lateral pipes and connecting said pouring cup with said cavity for introducing into the cavity burning combustion gases for the preheating of the welding zone; and a movable plug able to close the axial pipe after the preheating to constrain the welding metal poured in the said cup to flow in said central cavity only through said lateral pouring pipes.

2. A mould as claimed in claim 1, wherein the plug is composed of a light material having a conical shape so as to be raised by the welding metal when the mould cavity is full in order to open the axial pipe whereby said plug performs the function of a vent, and is provided with a metal rod permitting its handling.

3. Method for the aluminothermal welding of shaped bars of the class of rails and having a cross-section substantially symmetric about a plane, comprising the steps of: enclosing the welding zone of the two ends of the bars to be welded with a welding mould having two lateral symmetrically located apertures and a central aperture which may be obturated by means of removable closing means; removing the said closing means and preheating at least partly the said welding zone by means of a burning gaseous fuel mixture introduced through the central aperture so that said mixture circulates symmetrically and downwardly along these bar ends; obturating the central aperture with the closing means; and pouring the welding metal which is constrained to flow symmetrically only through the lateral apertures so that both the preheating of the bars and the mould and the flowing of the welding metal take place symmetrically with respect to the bars.

References Cited in the file of this patent

UNITED STATES PATENTS

| 1,557,453 | Gross | Oct. 13, 1925 |
| 1,732,382 | Schultz | Oct. 22, 1929 |
| 2,416,863 | Begtrup | Mar. 4, 1947 |

FOREIGN PATENTS

| 126,622 | Switzerland | July 2, 1928 |